United States Patent
Kravitz et al.

(10) Patent No.: US 6,907,127 B1
(45) Date of Patent: Jun. 14, 2005

(54) HIERARCHICAL KEY MANAGEMENT ENCODING AND DECODING

(75) Inventors: David William Kravitz, Fairfax, VA (US); David Moshe Goldshlag, Silver Spring, MD (US)

(73) Assignee: Digital Video Express, L.P., Richmond, VA (US)

( * ) Notice: Subject to any disclaimer, the term of this patent is extended or adjusted under 35 U.S.C. 154(b) by 961 days.

(21) Appl. No.: 09/613,284

(22) Filed: Jul. 10, 2000

Related U.S. Application Data
(60) Provisional application No. 60/140,252, filed on Jun. 18, 1999.

(51) Int. Cl.[7] .................................................. H04K 1/00
(52) U.S. Cl. ......................... 380/277; 380/30; 380/44; 380/45; 380/239; 380/283; 380/286; 380/273; 713/200; 713/156; 713/165; 713/166; 705/51; 705/171
(58) Field of Search ........................... 380/277, 30, 44, 380/45, 283, 273, 239, 286; 713/200–202, 156, 165–166; 705/51, 171

(56) References Cited

U.S. PATENT DOCUMENTS

| | | | | |
|---|---|---|---|---|
| 4,888,801 A | * | 12/1989 | Foster et al. | 380/277 |
| 5,345,508 A | * | 9/1994 | Lynn et al. | 380/46 |
| 5,381,480 A | * | 1/1995 | Butter et al. | 380/37 |
| 5,796,836 A | * | 8/1998 | Markham | 380/28 |
| 5,887,251 A | * | 3/1999 | Fehnel | 455/411 |
| 5,917,911 A | * | 6/1999 | Dabbish et al. | 380/286 |
| 5,995,625 A | * | 11/1999 | Sudia et al. | 705/51 |
| 6,055,316 A | * | 4/2000 | Perlman et al. | 380/262 |
| 6,301,362 B1 | * | 10/2001 | Matyas et al. | 380/37 |
| 6,333,983 B1 | * | 12/2001 | Enichen et al. | 380/273 |
| 2002/0101989 A1 | * | 8/2002 | Markandey et al. | 380/210 |

FOREIGN PATENT DOCUMENTS

| | | | |
|---|---|---|---|
| EP | 0725511 A2 | * 11/1994 | H04N/1/44 |
| EP | 0625845 A1 | * 1/1996 | H04L/9/06 |

OTHER PUBLICATIONS

Bruce Schneier, "Applied Crytography, protocols, Algorithms, and source code in c" 1996, John Wiley & Son, Inc. 2rd edition, pp. 189–197.*

Shigeta et al., "A Fine–Grained Protection Mechanism in Object–based Operating Systems", 1996, Proceeding of IWOOOS, p. 156–160.*

(Continued)

*Primary Examiner*—Gregory Morse
*Assistant Examiner*—Tongoc Tran
(74) *Attorney, Agent, or Firm*—David G. Grossman

(57) ABSTRACT

The present invention discloses a construction for key management module functionality which provides for secure encoding and decoding of messages which are up to two blocks long. A method for generating an encoded value having a first encoded value part and a second encoded value part from an unencoded value having a first unencoded value part and a second unencoded value part, comprising the steps of: obtaining an initialization vector; and generating the first and second encoded value parts. The first encoded value part is generated by: generating a first result by encrypting the first unencoded value part; generating a second result by performing an exclusive or operation on the first result and the second unencoded value part; generating a third result by performing an exclusive or operation on the second result and the initialization vector; generating a fourth result by encrypting the third result; generating a fifth result by performing an exclusive or operation on the fourth result and the first unencoded value part; and encrypting the fifth result. The second encoded value part is generated by encrypting the second result.

16 Claims, 5 Drawing Sheets

OTHER PUBLICATIONS

Lu et al., "Enhanced Protocols for Hierarchical Encryption Key Management for Secure Communication in Internet Environment:", Apr. 1992, IEEE Transactions on Communication vol. 40, No. 4, pp. 658–660.*

Stubblebine et al., "On Message Integrity in Cryptographic Protocols", 1992, IEEE, p. 85–104.*

Hellman, "A Cryptanalytic Time—Memory Trade Off", Jul. 1980, IEEE Transactions on Information Theory, vol. IT 26, No. 4, pp. 401–406.*

Coppersmith et al., "Attacks on MacDES MAC algorithm", Sep., 1999, Electronic Letters, vol. 35, No. 19, pp. 1626–1627.*

* cited by examiner

| Key Levels | Functions |
|---|---|
| Level 0 | Encrypt/decrypt data (ECB mode) |
| Level 1 | Unwrap black bits (if C1 $^1$ C2) to level 0 (CBC with firmware-specified IV); |
| | Encrypt data (ECB mode using swapped key blocks) |
| Level 2 | Wrap level i red key bits (CBC' mode with IVi); |
| | Export black bits; |
| | Unwrap black bits to level j as specified by firmware (CBC' mode with IVj) (if j = 0, resulting key bits may be marked as imported); |
| | Import red key bits as level 0 (these imported key bits are preferably wrapped by level 2 keys only) |
| | Encrypt/decrypt data (ECB mode) |

Figure 5

HIERARCHICAL KEY MANAGEMENT ENCODING AND DECODING

CROSS-REFERENCE TO RELATED APPLICATION

The present application claims the benefit of provisional patent application Ser. No. 60/140,252 to Kravitz et al., filed on Jun. 18, 1999, entitled "A Specific Construction for the Key Management Module Functionality", which is hereby incorporated by reference.

TECHNICAL FIELD

This invention relates generally to the field of encryption key management, and more particularly to a new mode of encoding and decoding keys in a hierarchical key management application.

BACKGROUND ART

There is a growing need to protect against the growing vulnerability of electronic information to unauthorized access. Computing and communications systems appear in virtually every sector of the economy and increasingly in homes and other locations. As the availability and use of computer based systems grow, so, too, does their interconnections. The result is a shared infrastructure of information, computing, and communications. The nature of shared infrastructures creates vulnerabilities for users. In general, easier access for users implies easier access for unauthorized users. Cryptography is a technology that may play an important role in addressing certain types of information vulnerability. Classically, cryptography protects data by using a cryptographic process and a shared secret called a key. In a process called encryption, plaintext may be transformed into cyphertext by an algorithm transform using a particular key; the use of a different key may result in a different cyphertext. In another process called decryption, an algorithm may transform cyphertext into plaintext using a particular key. Such a scheme, in which parties may need a common key, is called symmetric cryptography or secret-key cryptography and has the property of requiring a safe method of distributing keys to relevant parties. Methods of distributing keys to relevant parties are often called key distribution or key management. The present invention addresses the problem of key management for cryptographic systems.

Hierarchical key management systems generally depend on keys that encrypt other keys, as well as the use of the keys at the bottom of the hierarchy for confidentiality or authentication. Hierarchical key management systems typically have the problem that controlling applications may cause keys within the hierarchical key management systems to be compromised. That is, the applications may need to be trusted with respect to key compromise.

Current security architectures generally don't separate the correctness of the key management functions from the correctness of the application. This separation could simplify the design of cryptographic systems, as well as enabling the rigorous evaluation of the systems. Often systems are not implemented separately, in secure hardware.

There are several other problems that many hierarchical key management systems may have. A first problem is that there is a root entity that may compromise the entire system. A second problem is that key management systems may not be designed to support a variety of applications including: protecting the keys used to decrypt protected content, as well as the logging and charging for use of those keys; and delivering keys cryptographically embedded in tickets to users and resources.

What is needed is a hierarchical key management system that protects keys, in the sense that the controlling application may not cause keys within the hierarchical key management system to be compromised. That is, the application need not be trusted with respect to key compromise. The hierarchical key management system preferably separates the correctness of the key management functions from the correctness of the application, simplify the design of cryptographic systems and enabling the rigorous evaluation of the hierarchical key management system. Also needed is a hierarchical key management system that may be implemented separately in secure hardware, that preferably protects the root entity so that the entire system won't be compromised, and that may support a variety of applications.

DISCLOSURE OF THE INVENTION

One advantage of this invention is that it provides for secure encoding and decoding of messages which are up to two blocks long.

A further advantage of the invention is that it that protects keys from being compromised by a controlling application.

Another advantage of this invention is that it separates the key management functions from the application, simplifying the design of cryptographic systems that use the hierarchical key management system and enabling the rigorous evaluation of the hierarchical key management system.

To achieve the foregoing and other advantages, in accordance with all of the invention as embodied and broadly described herein, an apparatus for key management including a multitude of key registers having a hierarchy with levels; a multitude of type fields, wherein each type field is associated with a key register; a key management controller having a multitude of modes; at least one initialization vector; key management algorithms; and key management functions; wherein the mode is determined by the hierarchical level of the key register, and the key management algorithm used is determined by the key management function being used and the mode.

In yet a further aspect of the invention, a method for generating an encoded value having a first encoded value part and a second encoded value part from an unencoded value having a first unencoded value part and a second unencoded value part, comprising the steps of: obtaining an initialization vector, and generating the first and second encoded value parts. The first encoded value part is generated by: generating a first result by encrypting the first unencoded value part; generating a second result by performing an exclusive or operation on the first result and the second unencoded value part; generating a third result by performing an exclusive or operation on the second result and the initialization vector; generating a fourth result by encrypting the third result; generating a fifth result by performing an exclusive or operation on the fourth result and the first unencoded value part; and encrypting the fifth result. The second encoded value part is generated by encrypting the second result.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention.

FIG. 5 shows operations for information or keys at different hierarchical levels for a preferred embodiment of the present invention.

BEST MODE FOR PRACTICING THE INVENTION

Hierarchical key management systems depend on keys that encrypt other keys, as well as the use of the keys at the bottom of the hierarchy for confidentiality or authentication. The present invention discloses a general purpose Key Management Module (KMM) that may protect keys, in the sense that the controlling application may not cause keys within the KMM to be compromised. That is, the application preferably does not need not be trusted with respect to key compromise.

This security architecture may separate the correctness of the key management functions from the correctness of the application. This separation simplifies the design of cryptographic systems, as well as enabling the rigorous evaluation of the KMM. The KMM may also be implemented separately, in secure hardware.

The present invention may support applications that do not depend upon public key cryptography. Symmetric key cryptography is generally sufficient for applications that do not require perfect forward secrecy or non-repudiation. The important feature of hierarchical key management systems is that there is a root entity that can compromise the entire system.

The KMM may support a variety of applications. For example, the security of conditional access systems may depend upon protecting the keys used to decrypt protected content, as well as the logging and charging for use of those keys. An evaluated KMM may be trusted to protect the keys, while the application may be evaluated with respect to key logging and charging.

In a similar fashion, the KMM may support an applications like Kerberos authentication where a ticket-granting service delivers keys cryptographically embedded in tickets to users and resources, enabling them to communicate. The KMM may support ticket creation, delivery, and use, as well as use of the embedded key.

The KMM may differentiate between keys that encrypt other keys (KKs), and keys that encrypt data (DKs). Therefore, any compromised KK may be used to encrypt unknown keys, thus compromising them.

Figure 1:
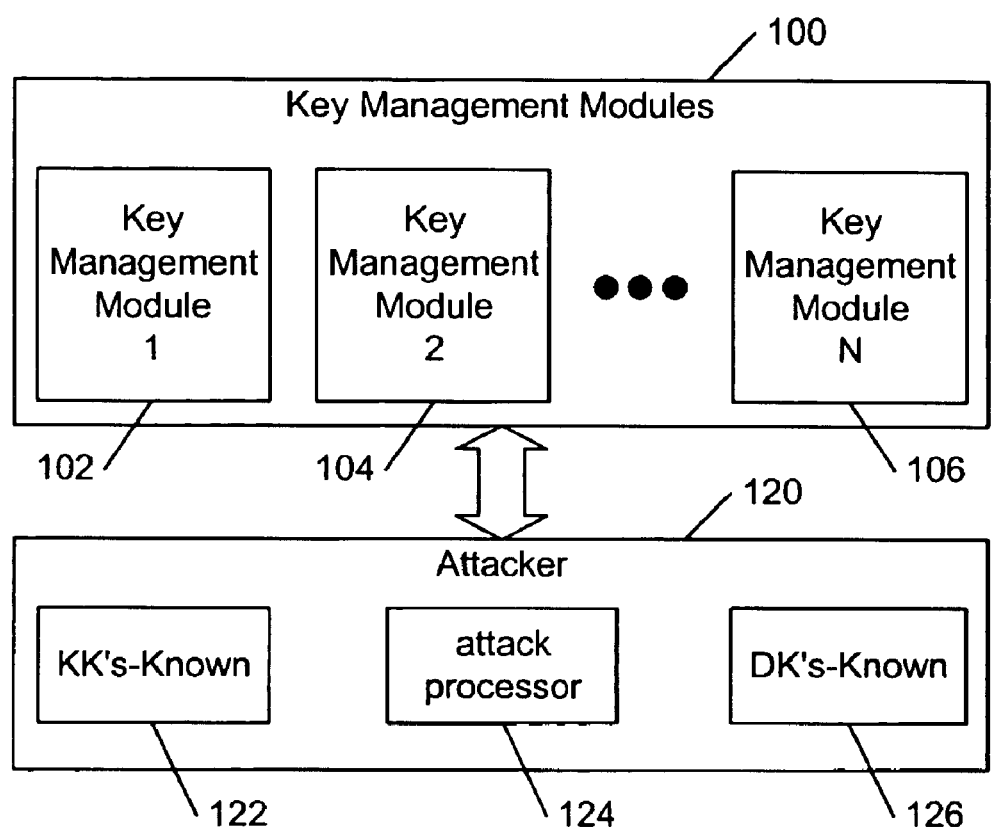
FIG. 1 is a block diagram showing several key management modules and an attacker.
Figure 2:
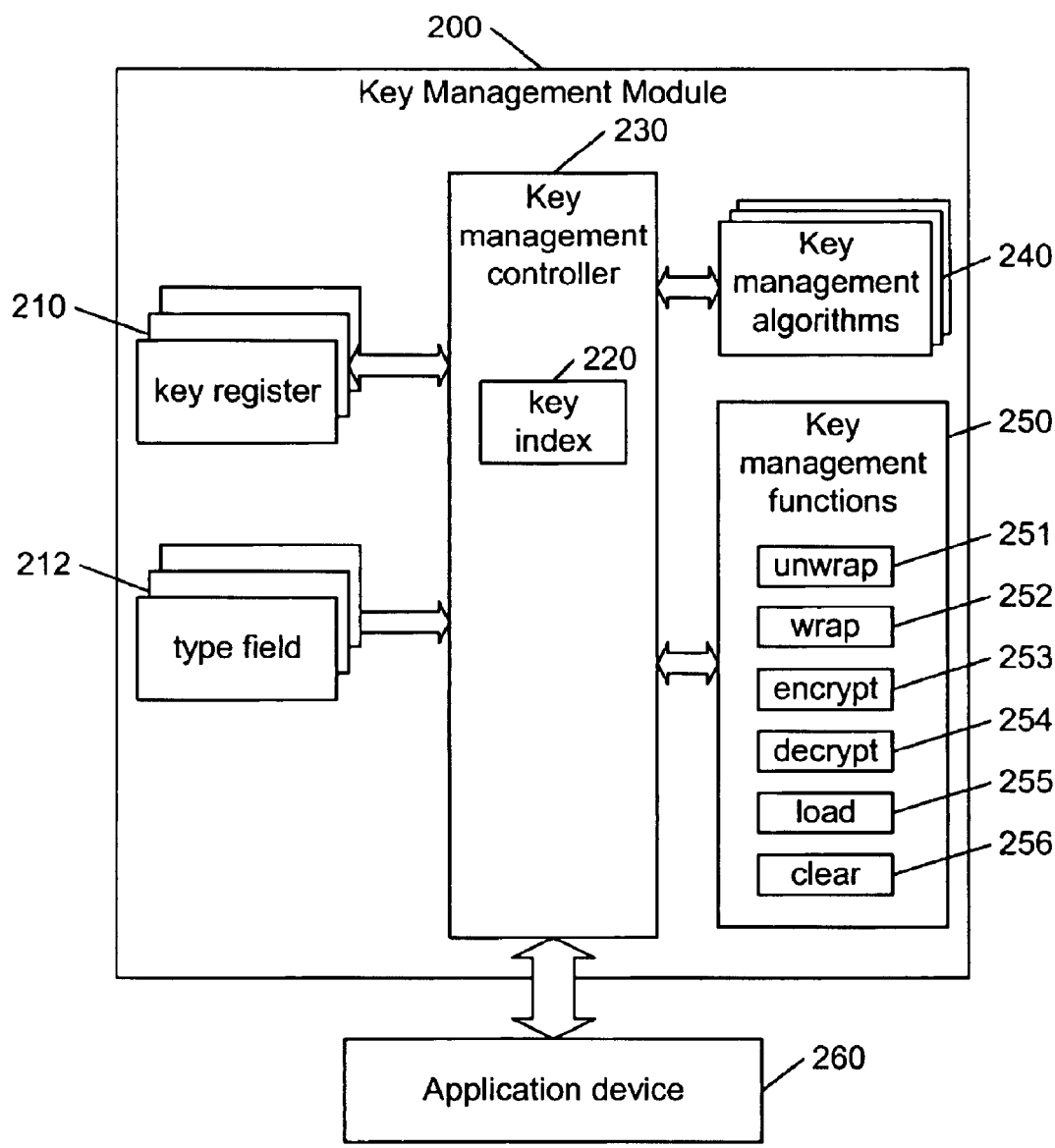
FIG. 2 is a block diagram of an embodiment of a key management module.

Referring to FIG. 1, given a set of key management modules 100 (illustrated as 102, 104, and 106), and two sets of keys that the attacker 120 knows, DKs-KNOWN of DKs 122, and KKs-KNOWN of KKs 126, the system may satisfy the following security properties, in the absence of attacking keys cryptanalytically, or learning them from non-KMM devices:

Invariant: KKs-KNOWN={ }
Invariant: DKs-KNOWN is constant

The attacker 120 may be treated as a machine that uses the keys in KKs-KNOWN 122 in its attacks, in its attempts to add more keys to DKs-KNOWN 126.

Nothing about the KMM may be assumed to be secret, except for the keys. Furthermore, the KMM is preferably designed to limit the consequence of compromise of keys.

The KMM 200 may contain an unspecified number of key registers 210, wherein each register 210 may be specified by a key index 220. The registers 210 may be used to store plaintext keys in a key field. A type field 212 may be associated with each register 210 and may specify whether the associated register is empty, or what the stored key type is. Legitimate key types may be restricted to KK or DK. KKs may be used to wrap (i.e., encrypt) or unwrap (i.e., decrypt) other keys, while DKs may only be used to encrypt plaintext or decrypt ciphertext from outside of the KMM.

The KMM may also include a key management controller 230, key management algorithms 240 and key management functions 250. The key management functions 250 may perform operations used to control a KMM and may include unwrap 251, wrap 252, encrypt 253, decrypt 254, load 255, and clear 256.

The unwrap function 251 may have the form:

$$\text{unwrap}(\text{wrapped\_key}, \text{type}, \text{index}, \text{wrapping\_key\_index}). \quad (1)$$

This operation may unwrap the specified 'wrapped_key', using the wrapping key stored in the register 210 referenced by 'wrapping_key_index', using an associated algorithm 240 for unwrapping keys specified by 'type'. The wrapping key is preferably a KK. The unwrapped key may be stored in a register 210 referenced by 'index' in the KMM and the associated type field 212 may be set to 'type'.

The wrap function 252 may have the form:

$$\text{wrapped\_key}:=\text{wrap}(\text{index}, \text{wrapping\_key\_index}). \quad (2)$$

This operation may wrap the index'ed key using the wrapping key stored in the wrapping_key_index'ed register 210, using an algorithm 240 for wrapping keys appropriate for the type 212 of the index'ed key. The wrapping key may be a KK. The wrapped key may be returned.

The encrypt function 253 may have the form:

$$\text{cipher}:=\text{encrypt}(\text{data}, \text{key\_index}). \quad (3)$$

The 'data' may be encrypted by the key in the key_index'ed register 210. The key may be a DK. The cipher may be returned.

The decrypt function 254 may have the form:

$$\text{plaintext}:=\text{decrypt}(\text{cipher}, \text{key\_index}). \quad (4)$$

The cipher may be decrypted by a key in the key_index'ed register 210. The key may be a DK. The plaintext may be returned.

The load function 255 may have the form:

$$\text{load}(\text{key}, \text{index}). \quad (5)$$

The plaintext 'key' may be stored in the index'ed register 210. The associated type field 212 may be set to DK. This operation preferably allows plaintext DKs to be imported into the KMM, and subsequently used as a DK.

The clear function may have the form:

$$\text{clear}(\text{index}). \quad (6)$$

The index'ed register 210 may be cleared, and the associated type field 212 may be set to empty.

Two embodiments of the present invention for utilizing mechanisms for the secure wrapping and unwrapping of keys will now be disclosed. The operations $E_{KK}$ and $D_{KK}$ denote encryption and decryption, respectively, under the key KK.

A DK may be wrapped with a KK as per the first embodiment by:

$$\text{wrapped\_key} := E_{KK}(DK)) \qquad (7)$$

A corresponding unwrap operation may be:

$$DK := D_{KK}(D_{KK}(\text{wrapped\_key})) \qquad (8)$$

When this operation is used to unwrap a key, the resultant key type may be set to be a DK.

A KK' may be wrapped with a KK by:

$$\text{wrapped\_key} := E_{KK}(KK') \qquad (9)$$

A corresponding unwrap operation may be:

$$KK' := D_{KX}(\text{wrapped\_key}) \qquad (10)$$

When this operation is used to unwrap a key, the resultant key type may be set to be a KK.

A second embodiment of the present invention may include using a bitwise exclusive- or (denoted as a ⊕ operation). To wrap a DK with a KK:

$$\text{wrapped\_key} := E_{KK}(DK \oplus E_{KK}(\text{keytag}_{DataKey})) \qquad (11)$$

A corresponding unwrap operation may be:

$$DK := D_{KK}(\text{wrapped\_key}) \oplus E_{KK}(\text{keytag}_{DataKey}) \qquad (12)$$

When this operation is used to unwrap a key, the resultant key type may be set to be a DK. A KK' may be wrapped with a KK by:

$$\text{wrapped\_key} := E_{KK}(KK' \oplus E_{KK}(\text{keytag}_{KeyKey})) \qquad (13)$$

A corresponding unwrap operation may be:

$$KK' := D_{KK}(\text{wrapped\_key}) \oplus E_{KK}(\text{keytag}_{KeyKey}) \qquad (14)$$

When this operation is used to unwrap a key, the resultant key type may be set to be a KK. It may be required that all KMMs sharing keys may need to use the same values for $\text{keytag}_{DataKey}$ and $\text{keytag}_{KeyKey}$, where $\text{keytag}_{DataKey} \neq \text{keytag}_{KeyKey}$.

In order to satisfy our security properties, it may be true that known DKs alone cannot be used to learn other DKs (or KKs) by means of the six legitimate operations. If we consider the wrapping and unwrapping of keys at a single level, i.e., where the wrapping/unwrapping operation is fixed, then this attribute may be maintained because a well-designed block cipher has the property that a single bit-inversion between two ciphertext blocks may result in uncorrelated plaintext blocks. It may be interesting to note that chaining a strong block cipher may not preserve this property. Consider, for example, encrypting a double plaintext block $(P_1;P_2)$ under cipher-block chaining where $C_1 = E(P_1 \oplus IV)$ and $C_2 = E(P_2 \oplus C_1)$ and IV is an initialization vector. Then, since the decryption process yields $D(C_1) \oplus IV$ and $D(C_2) \oplus C_1$, modifying $C_2$ to some $C_2'$ does not affect the value of the first recovered plaintext block.

Next, consider the other potential avenue of attack, which consists of unwrapping or loading a key into a key register such that the plaintext key is a known offset of a key in a register at a different designated level. Suppose, first, that the known offset is 0 (i.e., the bitwise exclusive- or of the two plaintext keys is 0). Then the attacker with such a "duplicate" key at his disposal may learn values of DKs or KKs even if KKs-KNOWN and DKs-KNOWN are initially both null. The key may be used as a KK to wrap a target key (using operation 2), and the output is decrypted by the same key as a DK (using operation 4), resulting in the plaintext target key. If the known offset is not equal to 0, then knowledge of the DK may still imply knowledge of the corresponding KK, which could yield the plaintext target key wrapped under that KK. If the attack is such that a key at level DK may be moved up to level KK with a known offset, the level DK key may be loaded in directly using operation 5. We demonstrate below how designs close to the first and second embodiments of the present invention, respectively, may bee subject to attack because they allow movement of keys between levels.

There are two important design principles in the first embodiment of the present invention. The first principal is that intermediate results of wrap or unwrap operations may not be observable outside the KMM. The second principal is that the application of the wrapping operation for DKs may not be able to be repeatedly applied to effect the wrapping operation for KKs.

With respect to the first principal, if intermediate results were observable, then a DK could be loaded and wrapped, and then transformed within a KMM register to a KK by unwrapping the intermediate wrapping result $E_{KK}(DK))$.

With respect to the second principal, the first embodiment may safely be generalized to having wrapping of DKs involve an even total of block encryption iterations and wrapping of KKs involve an odd total of block encryption iterations.

Notice that, if the wrapping operation for DKs could be iterated to effect wrapping of a KK, as for example if the wrapping of DK is $E_{KK}(DK)$ and the wrapping of KK' is $E_{KK}E_{KK}(KK')$, then wrapping, re-loading, and wrapping a DK could unwrap to a KK.

The important design principle in the second embodiment may be that the keytags may be used indirectly (e.g., after being encrypted by the wrapping key). Specifically, a variant of the second embodiment may not encrypt the keytag under the KK is flawed:

A DK may be wrapped with a KK:

$$\text{wrapped\_key} := E_{KK}(DK \oplus \text{keytag}_{DataKey}) \qquad (15)$$

A corresponding unwrap operation may be:

$$DK := D_{KK}(\text{wrapped\_key}) \oplus \text{keytag}_{DataKey} \qquad (16)$$

When this operation is used to unwrap a key, the resultant key type may be set to be a DK.

To wrap a KK' with a KK:

$$\text{wrapped\_key} := E_{KK}(KK' \oplus \text{keytag}_{KeyKey}) \qquad (17)$$

A corresponding unwrap operation may be:

$$KK' := D_{KK}(\text{wrapped\_key})) \oplus \text{keytag}_{KeyKey} \qquad (18)$$

When this operation is used to unwrap a key, the resultant key type may be set to be a KK.

This variant may be flawed, because a wrapped DK may be unwrapped as a KK with resulting plaintext value being a known offset from the plaintext DK. Specifically, the plaintext KK may be $D_{KK}(E_{KK}(DK \oplus \text{keytag}_{DataKey}) \oplus \text{keytag}_{KeyKey})$ which is $DK \oplus \text{keytag}_{DataKey} \oplus \text{keytag}_{KeyKey}$.

For the second embodiment of the present invention, wrapping a DK and unwrapping the result as a KK could yield $DK \oplus E_{KK}(\text{keytag}_{DataKey}) \oplus E_{KK}(\text{keytag}_{KeyKey})$. Here the offset from DK is not known. Note that since, unlike the first embodiment, this offset may be constant for a given wrapping/unwrapping key, repeating this procedure for two DKs could result in two KKs whose sum is the same as the sum of the two DKs. This property is not exploitable, however, since this gives no advantage in solving for any one of the KKs, even if the two DKs are known.

By further restricting the operations in a KMM, the KMM's security may be tailored to a particular application. For example, KMMs that are intended to be used in hierarchical key management systems with peer-to-peer communication may be subject to more attacks than those used in similar hierarchical systems without peer-to-peer communication.

The compromise of communication between two peers should not spread to compromise of communication with a third peer. However, compromise of communication between a node and the root may compromise all of that node's communication.

Figure 3:
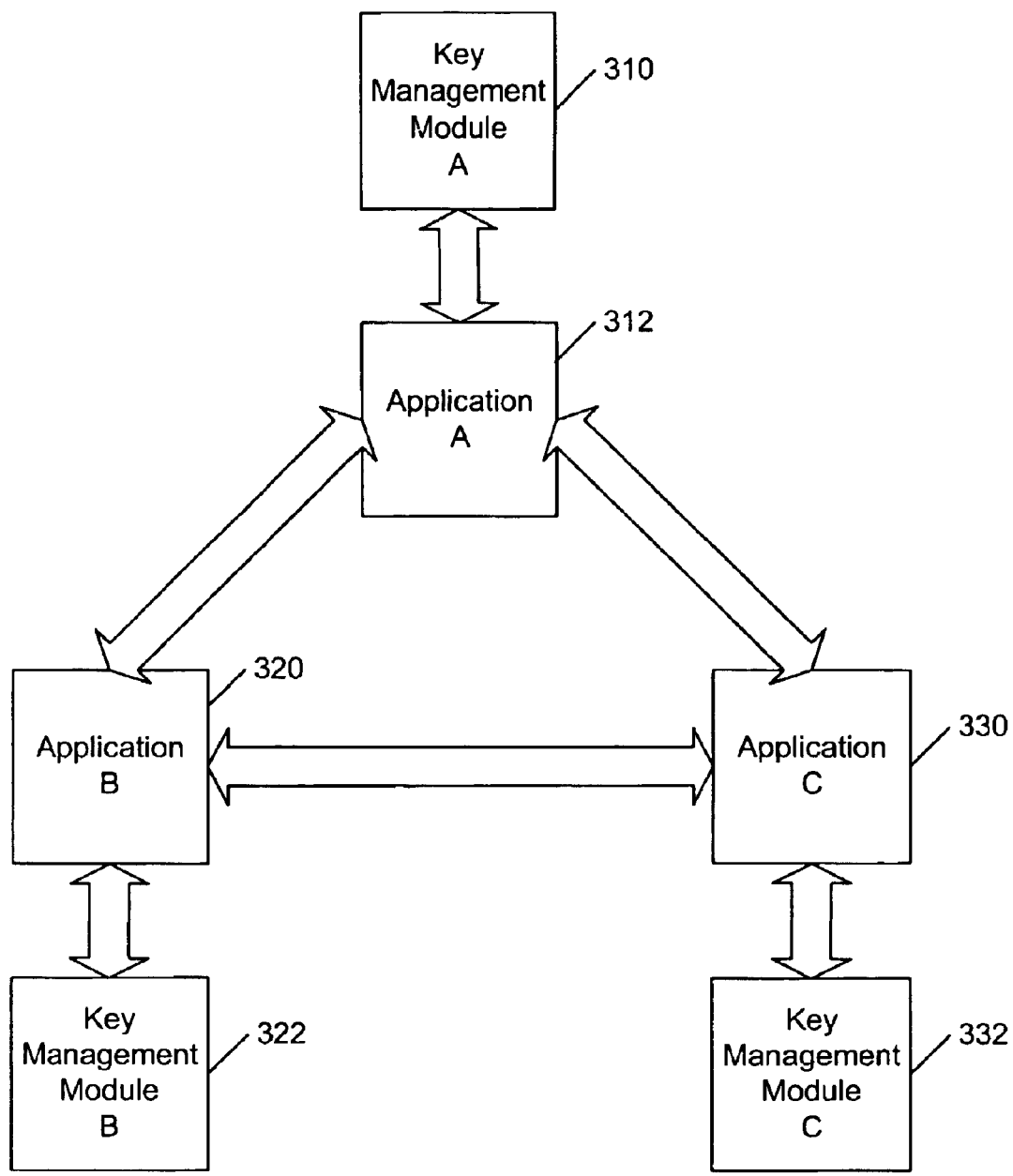
FIG. 3 is a block diagram illustrating several applications with key management modules interacting.

FIG. 3 is a block diagram illustrating three applications A 310, B 320, and C 330, each with a KMM (312, 322, and 332 respecitvely) interacting. Consider the two peers, A 310 and B 320, that communicate via a shared KK'. The root encrypts this KK' under the pair-wise unique KKs that the root shares with each node. The secrecy of B's communication with peers other than A 310 must not depend upon how well A 310 protects KK'.

There may be two levels of attack. In the simpler case, an attacker should not be able to use the shared KK' obtained from A 310 to compromise communication between B 320 and C. This attack may be passive, or active in the sense that the attacker interrupts the communication protocol between B 320 and C 330. This attack may not be possible with the present invention.

At another level, the attacker may not be able to use the shared KK' obtained from A 310, in conjunction with direct use of B's KMM 322, to reveal secrets B 320 shared with C 330. That is, the attacker may use the operations of B's KMM 322 in any way, but may not otherwise compromise B's KMM 322. The attacker uses B's KMM 322 to wrap KKs that B 320 shares with C 330, under the compromised KK' that B 320 shares with A 310.

This latter attack may depend upon a KK being able to wrap keys that were previously wrapped by a different KK. This may enable keys to move between trust domains—between the shared relationship between B 320 and C 330, and the separate relationship between B 320 and A 310.

Countering the attack may require breaking the transitivity of key wrapping and unwrapping operations. This may be done in one of two ways. Either the wrapping operation (operation 2) in the KMM may not be implemented. Or, the target of that operation may be limited to keys that were loaded into the KMM as plaintext (operation 5). Both approaches prevent keys that were meant by the root to enable communication between two peers to be learned by a third peer.

If peers shared only DKs (instead of KKs), neither of these constraints would be necessary, since the attack may not be feasible. However, it may be desirable for peers to share KKs for the long term, and to freshen the session key periodically without contacting the root. The decision when to do this freshening is under the control of the application.

To use the KMM, it must be initialized with one or more keys. One way to do this is to define an operation that enables bootstrapping from a single loaded key such as:

Initialize(key, index)     (19)

This command may clear all registers in the KMM, stores one plaintext key in the indexed register, and sets the type of that key to KK. It may be crucial to clear all registers before initializing the KMM. Otherwise, importing a known KK key may allow the compromise of all keys already in the KMM. Furthermore, the application that initialized the KMM may need to destroy its plaintext copy of the key after initializing the KMM.

Notice that because there are no secrets in the KMM's design, loading a single KK key in this way enables the initializing application to load an arbitrary number of keys, by the application simulating the wrapping of those keys with the single KK key before initializing the KMM. These wrapped keys may later be used by the KMM through the unwrap operation (operation 1 above).

One might ask why this single KK used to initialize the KMM is not generated internally to the KMM, perhaps using a built-in random-number generator. Internal generation would be fine if the KMM is meant to be an isolated key storage device. However, if it is meant to communicate with other KMMs, it may need to share a KK with the root.

A more restricted form of simulation (which does not access KKs) may use the KMM itself to mimic KK wrapping operations at the DK level. (This may require that the encryption and decryption functions used in the wrap and unwrap operation are also used to implement the encrypt and decrypt functions in operations 3 and 4, respectively.) Consider the case where a publisher distributes encrypted content to his subscribers. Since subscribers never encrypt content themselves, they may never need the load key operation (operation 5), so that the operation need not be implemented in the KMM.

There are cases such as a where a publisher, for example, may want to use such a restricted KMM to encrypt new content under new DKs. As the publisher encrypts each new content under a new DK, he may want to wrap that key under each customer's KK, so the customer may access the content. But this restricted KMM may not allow loading plaintext DKs. The publisher may still do this, in the following way: Each customer's KK may be stored in the publisher's KMM as a DK. The new content key may encrypted as data under each such DK, to simulate the wrap operation. The customer unwraps the wrapped key in the usual way, and the plaintext key remains within his KMM. Notice that customers' KKs never exist as plaintext outside of a KMM.

The type associated with a key defines the permitted operations that may be done with that key. These operations may be selected to provide the required system functionality, yet not compromise security. Although we define here only two key types, additional key types could give new functionality or further partition functionality. For example, it may be useful to define a hierarchy of KKs, whereby KKs can only wrap KKs of a lower level (or even only the next lower level).

The KMM could also specify several different types of DKs each allowing a specific operation. The data encrypt and decrypt operations in 3 and 4, may be considered as electronic codebook mode (i.e., the core cipher algorithm), from which the application may build other modes, including MAC (message authentication code) authentication. The KMM could also do these operations internally, using data supplied by the application. But such internal operations do not constrain the use of the DK unless the operations may not be combined to build larger operations. For example, if the MAC operation allows internal MAC'ing with an application-specified IV (initialization vector), then the DK essentially may allow generalized electronic codebook mode (and other modes).

The KMM may also include public key negotiation protocols, which may be used to share new KKs between KMMs, provided that the trust relationship between the negotiating KMMs is validated as well. A simple way to add in perfect forward secrecy without requiring authenticated public keys is to mix a shared symmetric key with the result of an ephemeral Diffie-Hellman key agreement.

Unless the restricted form of simulation is important, the encrypt and decrypt functions in the key wrapping operations may not need to use the same cryptography as used by DKs.

If the hierarchical key management system has more than one root, it may be partitioned into parallel KMMs.

The present invention supports hierarchical key management systems. Such infrastructures may support many applications, including Kerberos type authorization systems, and data distribution via conditional access systems. The KMM may prevent controlling application from compromising keys.

The KMM may require only limited internal functionality, to facilitate rigorous evaluation and correct implementation. It may require only the ability to encrypt and decrypt under a strong symmetric cipher, several internal registers for plaintext keys, and control logic for operating on those keys. The control logic defines the operations permitted on each type of key. The supported operations provide the required functionality, yet satisfy the security requirements.

The design technique used by the present invention types keys implicitly, rather than by adding a typing field to the key record. When a wrapped key is unwrapped, the unwrapping mechanism used may define the resultant key type. The key type in turn may define the operations permitted with the key. The security of implicit typing may depend upon the following property: The unwrapping operation may either produce the expected key, or produce random bits which may be unknown to the attacker. Although those random bits could then be used as a legitimate key, the attacker may not learn information in that way. Implicit typing preferably avoids the complexity of guaranteeing the integrity of a larger key record.

We will now discuss a specific construction for the key management module functionality. In the following description, red may refer to plain text information such as unencoded keys and data and may denoted as P1 and P2, and black may refer to cipher text information such as encoded keys and data and be denoted as C1 and C2. The key management goals of this specific construction are that red keys (P1 P2) may not be exported from the KMM, and that the chip firmware may not compromise keys.

Different modes may be used by the present invention. The modes are groups of algorithms that may be used in performing operations such as encode, decode, wrap and unwrap.

An example of a mode known to those skilled in the art is electronic codebook (ECB) mode. ECB mode is a relatively straight forward encoding and decoding mode and may be defined as:

$$C1=E(P1)$$

$$C2=E(P2)$$

$$P1=D(C1)$$

$$P2=D(C2)$$

where E and D represent encryption and decryption respectively.

Another example of a mode known to those skilled in the art is the cipher block chaining (CBC) mode. CBC mode is a chaining mode where part of an operation may be the result of either a previous operation or another predetermined value such as an initialization vector (IV). CBC mode may be defined by:

$$C1=E(P1 \oplus IV)$$

$$C2=E(P2 \oplus C1)$$

$$P1=D(C1) \oplus IV$$

$$P2=D(C2) \oplus C1$$

where $\oplus$ denotes an exclusive OR operation. This specific embodiment of the present invention uses a new mode hereafter refered to CBC' mode. Other embodiments of the invention may need to encode a block of data that is as long as a key. They may use cryptography including two-key triple-DES, where the limit on block-size of "data" to be encoded or decoded may be smaller than the total key size. Here the red key to be wrapped (or black key to be unwrapped) may fit in two "data" blocks, but not one. The normal way of chaining blocks together, namely CBC mode, could fail at Level 2 with respect to security basically because modifying C2 and leaving C1 unchanged may leave the recovery of P1 unchanged. The CBC' mode solves this potential problem. CBC' is a new cryptographic mode which provides for secure encoding and decoding of messages which are up to two blocks long, where the underlying encryption/decryption E/D (single-block) engine may be left unchanged. CBC' mode may be defined by:

$$C1=E(P1 \oplus E(IV_i \oplus P2 \oplus E(P1)))$$

$$C2=E(P2 \oplus E(P1))$$

$$P1=D(C1) \oplus E(IV_i \oplus D(C2))$$

$$P2=D(C2) \oplus E(P1)$$

Note that C2 may equal $E(D(D(C1) \oplus P1) \oplus IVi)$. This shows dependence of C2 on C1 and P1, while C2 may equal $E(P2 \oplus E(P1))$ showing dependence of C2 on P2 and P1.

Figure 4:
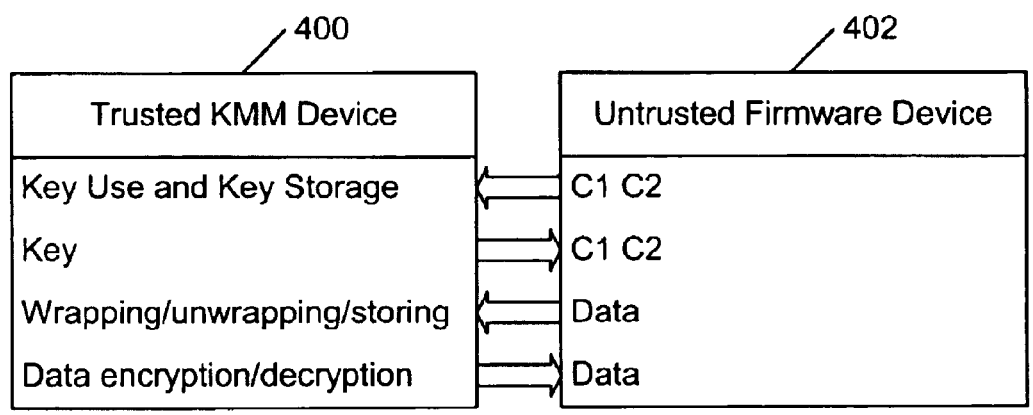
FIG. 4 shows information transfer between a KMM trusted device and an untrusted firmware device.

FIG. 4 shows information transfer between a KMM trusted device 400 and an untrusted firmware device 402. A trusted KMM 400 is on the left denoting functions that it may perform. The untrusted firmware device 402 is on the right showing information that may be either input to or output from the KMM 400.

FIG. 5 shows operations for information or keys at different hierarchical levels for a preferred embodiment of the present invention. At level 0, data may be encoded or decoded in ECB mode. At level 1, black bits may be unwrapped to level 0 using CBC mode with a firmware specified initialization vector. The firmware may specify the initialization vector since security may not rely on the initialization vector being fixed by the hardware. C1 and C2 are preferably not equal red embodiment of the present invention. Data may also be encrypted at level 1 using ECB mode with swapped key blocks. The purpose of swapping the key blocks is to create a new key from an old key. On skilled in the art will recognize that many other methods may be used to create such a key such as a deterministic non-identity function and that the invention is not limited to only swapping blocks. At level 2, red key bits at a level specified by i may be wrapped using CBC' mode with an $IV_i$. Black bits may be exported at level 2. Black bits may also be unwrapped to a level specified by j using CBC' mode with an $IV_j$. Red bits may also be imported as level 0 bits at level 2. However, these bits are preferably wrapped only by level 2 keys.

In the CBC unwrap operation using a level 1 key, where $P1=D(C1) \oplus IV$ and $P2=D(C2) \oplus C1$, the D may represent D subscripted by K where K is the level 1 unwrapping key. Here (C1,C2) may be the black key being unwrapped, where the resulting (P1,P2) may be assigned as a level 0 key. Similarly, in the CBC' wrap operation using a level 2 key, the E may represent E subscripted by K where K is the level 2 wrapping key. Here (P1,P2) may be the level i red key being wrapped, where the resulting (C1,C2) may be the black key.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus for key management comprising:
   (a) a multitude of key registers, said multitude of key registers having a hierarchy with levels;
   (b) a multitude of type fields, wherein each type field is associated with a key register;
   (c) a key management controller, said key management controller having a multitude of modes;
   (d) at least one initialization vector;
   (e) key management algorithms; and
   (f) key management functions;
   wherein said mode is determined by the hierarchical level of the key register, and the key management algorithm used is determined by the key management function being used and said mode.

2. The apparatus according to claim 1 wherein said multitude of modes includes a Cipher Block Chaining Prime (CBC') mode.

3. The apparatus according to claim 2 wherein said multitude of modes further includes a Cipher Block Chaining (CBC) mode.

4. The apparatus according to claim 2 wherein said multitude of modes further includes an Electronic Codebook (ECB) mode.

5. The apparatus according to claim 4 wherein said ECB mode uses a deterministic non-identity function.

6. The apparatus according to claim 4 wherein said ECB mode uses swapped key blocks.

7. The apparatus according to claim 3 wherein said CBC mode uses a firmware specified initialization vector.

8. The apparatus according to claim 2 wherein said CBC' mode uses an initialization vector to wrap level i red key bits, said initialization vector determined by level i.

9. The apparatus according to claim 2 wherein said CBC' mode uses an initialization vector to unwrap black bits to level j, said initialization vector determined by level j.

10. The apparatus according to claim 4 wherein at level 0 said mode is ECB mode and said multitude of functions include:
    (a) an encode function; and
    (b) a decode function.

11. The apparatus according to claim 4 wherein at level 1 said multitude of functions includes:
    (a) an unwrap black bits to level 0 function, wherein said mode is a CBC mode with a firmware specified initialization vector; and
    (b) an encode data function, wherein said mode is an ECB mode using a swapped key blocks.

12. The apparatus according to claim 4 wherein at level 2 said multitude of functions includes:
    (a) a wrap level i red key bits, wherein said mode is a CBC' mode with an initialization vector determined by the level i;
    (b) an export black bits function;
    (c) an unwrap black bits to level j as determined by firmware, wherein said mode is CBC' mode with an initialization vector determined by the level j; and
    (d) an import red key bits as level 0 function.

13. A method for generating an encoded value having a first encoded value part and a second encoded value part from an unencoded value having a first unencoded value part and a second unencoded value part, comprising the steps of:
    (a) obtaining an initialization vector;
    (b) generating the first encoded value part by:
        (i) generating a first result by encrypting the first unencoded value part;
        (ii) generating a second result by performing an exclusive or operation on the first result and the second unencoded value part;
        (iii) generating a third result by performing an exclusive or operation on the second result and the initialization vector;
        (iv) generating a fourth result by encrypting the third result;
        (v) generating a fifth result by performing an exclusive or operation on the fourth result and the first unencoded value part; and
        (vi) encrypting the fifth result; and
    (c) generating the second encoded value part by encrypting the second result.

14. A method according to claim 13, wherein said step of obtaining an initialization vector further includes the steps of:
    (a) determining a hierarchical level for the encoded value; and
    (b) obtaining the initialization vector determined by the hierarchical level.

15. A method for generating an unencoded value having a first unencoded value part and a second unencoded value part from an encoded value having a first encoded value part and a second encoded value part, comprising the steps of:
    (a) obtaining an initialization vector;
    (b) generating the first unencoded value part by:
        (i) generating a first result by decrypting the second encoded value part;
        (ii) generating a second result by performing an exclusive or operation on the first result and the initialization vector;
        (iii) generating a third result by encrypting the second result;
        (iv) generating a fourth result by decrypting the second encoded value part; and
        (v) performing an exclusive or operation on the third result and the fourth result;
    (c) generating the second unencoded value part by:
        (i) generating a fifth result by encrypting the first unencoded value part; and
        (ii) generating a sixth result by decrypting the second encoded value part; and
    (d) performing an exclusive or operation on the fifth result and the sixth result.

16. A method according to claim 15, wherein said step of obtaining an initialization vector further includes the steps of:
    (a) determining a hierarchical level for the encoded value; and
    (b) obtaining the initialization vector determined by the hierarchical level.

* * * * *